(12) United States Patent
Han et al.

(10) Patent No.: US 7,910,253 B2
(45) Date of Patent: Mar. 22, 2011

(54) REFORMER FOR FUEL CELL AND FUEL CELL USING THE SAME

(75) Inventors: Man-Seok Han, Suwon-si (KR);
Ju-Yong Kim, Suwon-si (KR);
Sung-Chul Lee, Suwon-si (KR);
Yong-Kul Lee, Suwon-si (KR);
Chan-Ho Lee, Suwon-si (KR); Jin-Goo Ahn, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 896 days.

(21) Appl. No.: 11/835,306

(22) Filed: Aug. 7, 2007

(65) Prior Publication Data
US 2008/0107934 A1   May 8, 2008

(30) Foreign Application Priority Data

Nov. 3, 2006   (KR) .................. 10-2006-0108461

(51) Int. Cl.
*H01M 8/06* (2006.01)
*H01M 8/02* (2006.01)
*B01J 8/00* (2006.01)

(52) U.S. Cl. .................. 429/420; 429/423; 422/198
(58) Field of Classification Search .................. 422/198; 429/420, 423
See application file for complete search history.

(56) References Cited

U.S. PATENT DOCUMENTS

| 4,963,339 A * | 10/1990 | Krishnamurthy et al. .. 423/437.2 |
| 5,645,951 A * | 7/1997 | Johnssen .................. 429/401 |
| 6,312,658 B1 * | 11/2001 | Hufton et al. .............. 423/418.2 |
| 6,541,143 B2 * | 4/2003 | Herdeg et al. ............... 429/416 |
| 6,984,372 B2 | 1/2006 | Randhava et al. |
| 2002/0025463 A1 * | 2/2002 | Derflinger et al. ............. 429/19 |

FOREIGN PATENT DOCUMENTS

| JP | H11-043303 A | 2/1999 |
| JP | 11097051 A * | 4/1999 |
| JP | 2001-115172 A | 4/2001 |
| JP | 2001-172003 A | 6/2001 |
| JP | 2002-037603 A | 2/2002 |
| JP | 2002158024 A * | 5/2002 |
| JP | 2003-327405 A | 11/2003 |
| JP | 2004-284912 A | 10/2004 |
| KR | 10-2001-0104711 A | 11/2001 |
| KR | 10-2004-0096977 A | 11/2004 |
| KR | 10-2005-0103568 A | 11/2005 |

* cited by examiner

*Primary Examiner* — Gregg Cantelmo
(74) *Attorney, Agent, or Firm* — Knobbe, Martens, Olson & Bear LLP

(57) ABSTRACT

Disclosed is a reformer for a fuel cell. The reformer for a fuel cell includes a reforming reactor generating reformed gas having abundant hydrogen gas by reforming fuel and steam and a standing shape of a water gas shift reactor coupled to the reforming reactor for lowering the concentration of carbon monoxide contained in the reformed gas. The water gas shift reactor has an opening. A pipe is coupled to the opening and has a portion located below the opening. Liquid water which may stay in the inside at the time that the operation stops can be drained out of the water gas shift reactor to prevent the water gas shift catalyst from being submerged in liquid water.

11 Claims, 3 Drawing Sheets

REFORMER FOR FUEL CELL AND FUEL CELL USING THE SAME

CROSS-REFERENCE TO RELATED APPLICATIONS

This application claims the benefit of Korean Patent Application No. 10-2006-0108461 filed on Nov. 3, 2006, in the Korean Intellectual Property Office, the disclosure of which is incorporated herein by reference in its entirety.

BACKGROUND

1. Field

The present invention relates to a fuel cell, and more particularly to a reformer for a fuel cell.

2. Discussion of Related Technology

A fuel cell, which is a power generation system that directly receives electricity from hydrocarbon-based organic fuel, such as methanol, ethanol, natural gas, butane and gasoline, etc., has been spotlighted as a next generation energy source for low pollution and high efficiency.

According to sorts of electrolyte used, fuel cells can be sorted as a phosphoric acid fuel cell, a molten carbonate fuel cell, a solid oxide fuel cell, a polymer electrolyte fuel cell and an alkaline fuel cell, etc. These respective fuel cells are basically operated based on the same principle, but are different in view of sorts of fuels used, operating temperatures, catalyst and electrolytes, etc. Among others, the polymer electrolyte membrane fuel cell (PEMFC) using polymer as electrolyte, has no risk of the corrosion or evaporation by the electrolyte and obtains high current density per the unit area. Furthermore, since the polymer electrolyte membrane fuel cell (PEMFC) has advantages of a remarkably high output feature and a low operating temperature feature over other fuel cells, it has actively been developed for being applicable to a mobile power source, such as a portable electronic equipment or a transportable power source, such as a power source for automobile as well as a distributed power source, such as a stationary power plant used in a house and a public building, etc.

A fuel cell is composed of a membrane electrode assembly (MEA) in a unit cell, and electricity is generated from each unit cell. The unit cell has a structure that an anode electrode and a cathode electrode having a catalyst layer applied thereto are adhered to each other, putting an electrolyte membrane therebetween. The electrochemical reaction equation between the anode electrode and the cathode electrode is as follows:

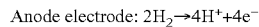

Anode electrode: $2H_2 \rightarrow 4H^+ + 4e^-$

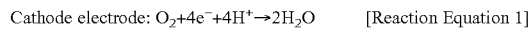

Cathode electrode: $O_2 + 4e^- + 4H^+ \rightarrow 2H_2O$  [Reaction Equation 1]

The power generated from the unit cell is weak as about 1V or so, often causing a case that a desired power cannot be obtained with only one unit cell. Therefore, in order to obtain a desired power, a fuel cell is usually manufactured in a stack shape that a plurality of unit cells is connected in series.

The discussion in this section is to provide general background information, and does not constitute an admission of prior art.

SUMMARY

One aspect of the invention provides a reformer for a fuel cell, comprising: a reforming reactor configured to convert fuel to a reformed gas comprising carbon monoxide; a water gas shift reactor comprising an inlet and an outlet, wherein the water gas shift reactor comprises a catalyst, and wherein the water gas shift reactor is configured to receive the reformed gas via the inlet, configured to oxidize at least part of the carbon monoxide contained in the reformed gas, and configured to discharge a resulting gas mixture via the outlet; and a pipe coupled to the inlet or outlet, wherein the pipe comprises a portion located below the inlet or outlet sufficient to drain liquid water out of the water gas shift reactor to the pipe such that the catalyst is not submerged in liquid water that is to form in the water gas shift reactor when the reformer is not in normal operation and that would otherwise submerge the catalyst.

In the foregoing reformer, the portion of the pipe may generally extend toward below. The portion located below the inlet or outlet may be directly attached to the inlet or outlet without an intervening portion therebetween that extends at about the same level as the inlet or outlet. The reformer may further comprise a drain port and a drain valve coupled to the pipe, wherein the drain valve is configured to drain liquid water staying in the pipe via the drain port. The reformer may further comprise a water reservoir coupled to the pipe, wherein the water reservoir may be configured to retain liquid water such that more liquid water can be drained from the water gas shift reactor than without the water reservoir. The reservoir may comprise a water absorber. The reservoir may comprise a drain port and a drain valve, wherein the drain valve may be configured to drain liquid water staying in the reservoir via the drain port. The water gas shift reactor may comprise a bottom wall and a side wall extending from the bottom wall, wherein the bottom wall and the side wall may define a space containing the catalyst, and wherein the inlet or outlet is formed through the bottom wall. The bottom wall may be the lowest wall of the water gas shift reactor. The side wall may extend in a direction inclined at an angle with respect to the direction of gravity.

Still in the foregoing reformer, the reformer may comprise a secondary water gas shift reactor comprising an inlet and an outlet, wherein the secondary water gas shift reactor comprises a catalyst, wherein the secondary water gas shift reactor is configured to receive the resulting gas mixture via the inlet, configured to oxidize at least part of carbon monoxide contained in the resulting gas mixture, and configured to discharge a second resulting gas mixture via the outlet, and wherein the pipe is coupled to the outlet of the water gas shift reactor and the inlet of the secondary water gas shift reactor, wherein the pipe comprises a secondary portion located below the inlet of the secondary water gas shift reactor sufficient to drain liquid water out of the secondary water gas shift reactor to the pipe such that the catalyst of the secondary water gas shift reactor is not submerged in liquid water that is to form in the secondary water gas shift reactor when the reformer is not in normal operation and that would otherwise submerge the catalyst of the second water gas shift reactor. During the normal operation of the reactors the resulting gas mixture may be hotter than the second resulting gas mixture.

Another aspect of the invention provides a fuel cell, comprising: the foregoing reformer; and a fuel cell stack operably connected to the reformer. Yet another aspecto of the invention provides a method of operating the foregoing fuel cell, the method comprising: running the reformer, wherein water vapor is supplied into the water gas shift reactor; and stopping the reformer, whereby at least part of water vapor is liquefied within the water gas shift reactor, wherein liquid water is drained out of the water gas shift reactor such that the catalyst is not submerged in liquid water.

An aspect of the present invention provides a new structure and shape of a water gas shift (WGS) reacting unit in a reformer in which a reforming reaction unit and WGS reacting unit are integrally manufactured in order to minimize the contact between catalyst and water in the WGS reacting unit. An aspect of the present invention provides a reformer for a fuel cell having a structure that water condensed in a WGS reacting unit can easily be exhausted in a gravity direction in the integral reformer. An aspect of the present invention provides a fuel cell having high efficiency capable of preventing deterioration of performance of a reformer.

An aspect of the invention provides a reformer for a fuel cell includes: a reforming reaction unit generating reformed gas having abundant hydrogen gas by reforming fuel and steam; and a standing shaped WGS reacting unit coupled to the reforming reaction unit for lowering the concentration of carbon monoxide contained in the reformed gas and exhausting moisture, which may stay in the inside at the time that the operation stops, in a gravity direction.

Preferably, a reformer for a fuel cell further includes a drain valve coupled to the WGS reacting unit and exhausting moisture flowed out from the WGS reacting unit. The reformer for a fuel cell further includes a moisture absorbing unit coupled to the WGS reacting unit and absorbing moisture flowed out from the WGS reacting unit. Preferably, the standing shaped WGS reacting unit includes a shape to be inclined in a predetermined tilt to a gravity direction. Preferably, the WGS reacting unit includes a WGS reacting unit for high temperature and a WGS reacting unit for low temperature each installed in a standing shape. Also, preferably, at least one of the WGS reacting unit for high temperature and the WGS reacting unit for low temperature includes a standing shape to be inclined in a predetermined tilt to a gravity direction. Preferably, the reformer for a fuel cell further includes a tube connecting the WGS reacting unit for high temperature with the WGS reacting unit for low temperature and allowing reformed gas to be flowed, and a drain valve coupled to the tube and exhausting the moisture flowed out from the WGS reacting unit for high temperature and the WGS reacting unit for low temperature. On the other hand, preferably, the reformer for a fuel cell includes a tube connecting the WGS reacting unit for high temperature with the WGS reacting unit for low temperature, and a moisture absorbing unit coupled to the tube not shutting of the flow passage of the tube and absorbing moisture flowed out from the WGS reacting unit for high temperature and the WGS reacting unit for low temperature.

Preferably, the reforming reaction unit and the WGS reacting unit for high temperature are integrally manufactured. Preferably, the reformer for a fuel cell further includes a heat source unit supplying heat required for the reforming reaction of the reforming reaction unit. The heat source unit includes a burner, wherein a nozzle of the burner can be installed in the inside of the reforming reaction unit by being coupled to the tube extended to the reforming reaction unit through the WGS reacting unit for high temperature. Preferably, the reformer for a fuel cell further includes a preheating block coupled to the front end of the reforming reaction unit and generating a high temperature of fuel and steam by heating fuel and water and then transferring the generated fuel and steam to the reforming reaction unit. Preferably, the WGS reacting unit for high temperature, the reforming reaction unit and the preheating block of the reformer for a fuel cell are stacked in sequence so that the WGS reacting unit for high temperature is positioned in the lower side, and the WGS reacting unit for low temperature is connected with the WGS reacting unit for high temperature through the tube and is disposed to be adjacent to the WGS reacting unit for high temperature.

An aspect of the invention provides a fuel cell includes: a main body of the fuel cell generating electrical energy by electro-chemically reacting reformed gas and oxidizer; the reformer supplying reformed gas to the main body of the fuel cell, and a purging apparatus removing moisture stayed in the reforming reaction unit and the WGS reacting unit in the reformer at the time that the operation stops.

DETAILED DESCRIPTION OF EMBODIMENTS

Figure 1:
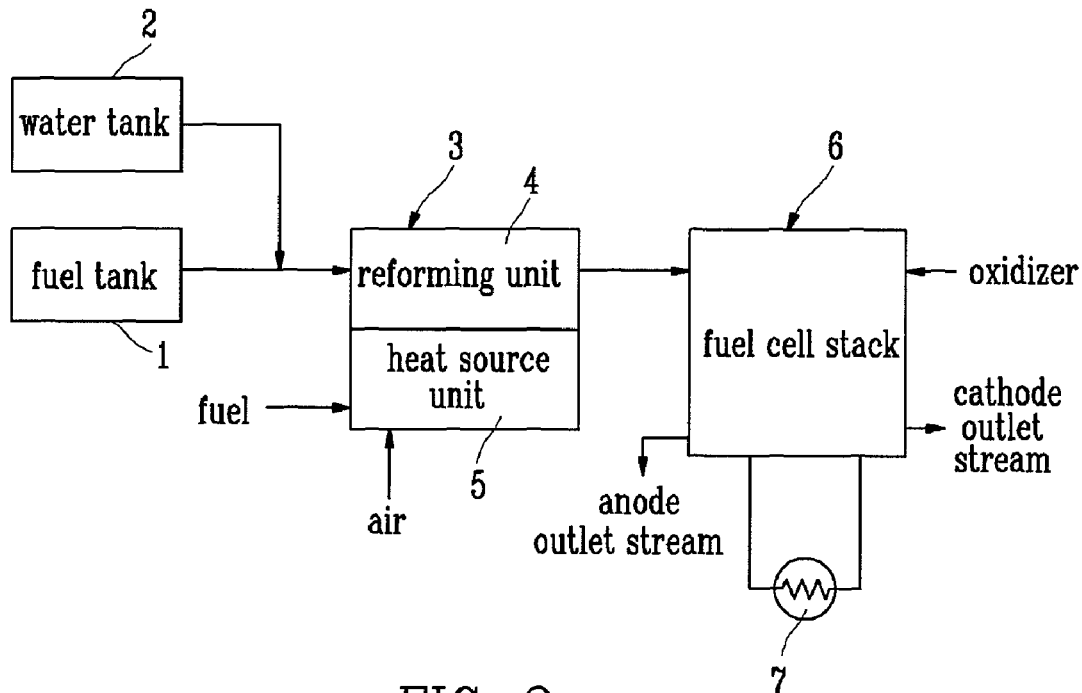
FIG. 1 is a schematic view of a polymer electrolyte fuel cell system.

Hereinafter, embodiments of the present invention will be described in a more detailed manner with reference to the accompanying drawings. The fuel usually means fuel capable of making hydrogen, such as methanol, butane, natural gas and gasoline, etc., and it may include water and air (oxygen) in a broad sense. However, the fuel to be described hereinafter may be defined as fuel capable of making hydrogen. And, in the drawings the thickness and the size of each constituent are exaggerated for the convenience and the clearness of explanation. In the drawings the same reference numerals indicate similar or identical elements.

FIG. 1 is a schematic view of a polymer electrolyte fuel cell system. As shown in FIG. 1, a general polymer electrolyte fuel cell system includes a fuel tank 1 storing hydrocarbon-based organic fuel, a water tank 2 storing water, a reformer 3 and a fuel cell stack 6. The reformer 3 includes a reforming unit 4 and a heat source unit 5. The reforming unit 4 transforms fuel supplied from the fuel tank 1 and water supplied from the water tank 2 into reformed gas having abundant hydrogen by means of a reforming catalyst reaction. The reforming unit 4 may include an evaporating unit mixing and preheating the fuel and the water, a reforming reaction unit transforming the heated fuel and steam into reformed gas, and a WGS reacting unit lowering the concentration of carbon monoxide within the reformed gas generated from the reforming reaction unit. The heat source unit 5 generates heat by oxidizing the fuel supplied from the fuel tank 1 or the external for supplying heat required for a catalyst reaction of the reforming unit 4 and supplies the generated heat to the reforming unit 4.

The fuel cell stack 6 has a configuration of a stacked shape of a plurality of unit cells including an ion conductivity polymer electrolyte membrane, electrodes including an anode electrode and a cathode electrode which electro-chemically react the fuel and the oxidizer each positioned on both sides of the electrolyte membrane. The fuel cell stack 6 generates electric energy by electro-chemical reaction of the reformed gas supplied from the reformer 3 and the anode electrode and the oxidizer supplied to the cathode electrode, and supplies the generated electric energy to a desired load 7.

In the reformer 3, reforming catalyst for producing hydrogen gas or catalyst for hydrogen production is usually provided in the reforming unit 4, and particularly, WGS catalyst for reducing CO concentration contained in the reformed gas or catalyst for CO reduction is usually provided in the WGS reacting unit in the reforming unit 4. Recently, WGS catalyst having excellent performance has been developed and commercialized. However, since the commercialized WGS catalyst having excellent performance has not been yet perfect in durability against water, and particularly, the activity thereof reduces in a liquefied moisture of high temperature that water evaporates, it is very important for the WGS catalyst to reduce contact liquefied water at the maximum.

This phenomenon may be occurred by condensing non-reacted water in the reforming reaction unit right after the operation of the reformer stops, wherein the reformer is configured oft the reforming reaction unit and the WGS reacting unit integrally manufactured. When a part of WGS catalyst in the WGS reacting unit is dipped in water, it may cause a problem that catalyst performance is deteriorated due to a separation of active substance. Also, when water gathers in the WGS reacting unit, the water gathered in the WGS reacting unit boils during a starting process of the reformer, resulting in that the performance of the WGS catalyst may be deteriorated.

Figure 2:
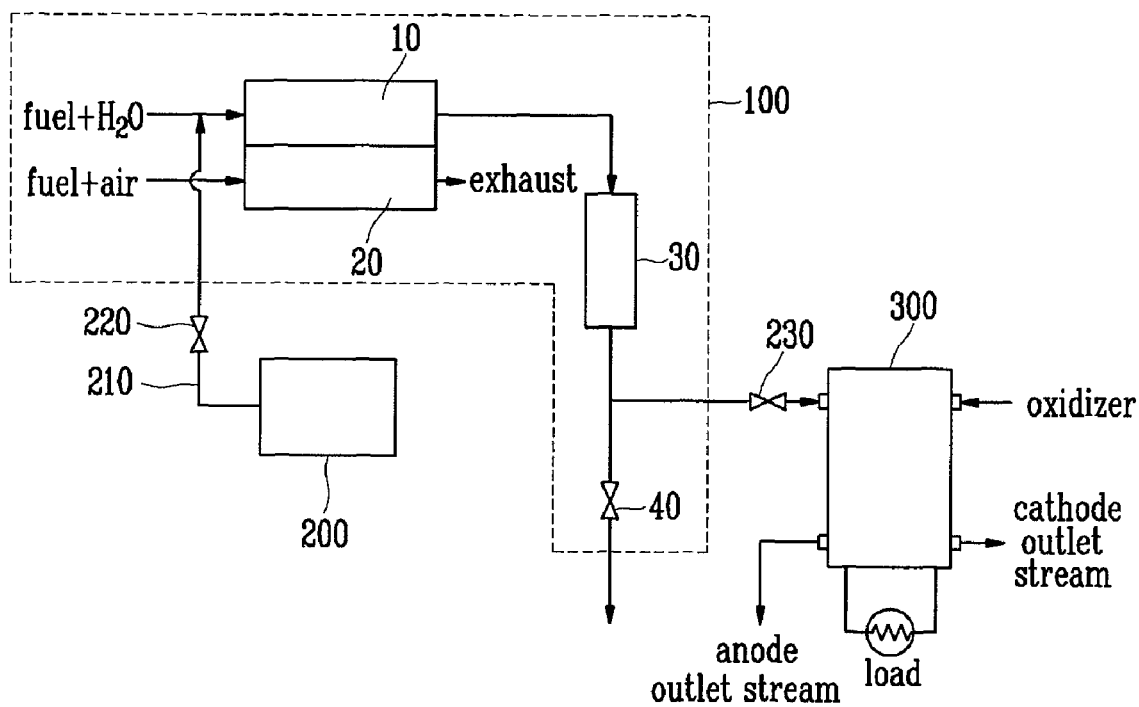
FIG. 2 is a block view of a fuel cell adopting a reformer according to one embodiment of the present invention.

FIG. 2 is a block diagram of a fuel cell adopting a reformer according to one embodiment of the present invention. Referring to FIG. 2, a fuel cell includes a reformer 100 efficiently removing water in a liquid phase which may stay in the inside at the time that the operation of the fuel cell stops, and a purging apparatus 200 clearing the reformer 100 and/or a main body 300 of the fuel cell at the time that the operation of the fuel cell stops.

The reformer 100 includes a reforming reaction unit or reforming reactor 10 transforming fuel into hydrogen gas; a heat source unit 20 supplying heat required for reforming reaction of the reforming reaction unit 10; a carbon monoxide (CO) reducing unit, of which inlet receiving reformed gas from the reforming reaction unit 10 is installed in the upper side, lowering the concentration of carbon monoxide in the reformed gas and exhausting the reformed gas in which the concentration of carbon monoxide is lowered through the outlet installed in the lower side or bottom; and a drain valve 40 connected with the outlet. The CO reducing unit 30 lowers the concentration of carbon monoxide contained in the reformed gas, but on the other hand it raises the concentration of hydrogen gas in the reformed gas. Therefore, the CO reducing unit 30 may be referred to as another reforming reaction unit.

The reforming reaction unit 10 includes a preheating block for mixing and heating fuel and water; and steam reforming reaction unit for transforming the heated fuel and steam into reformed gas having abundant hydrogen gas by means of a reforming catalyst reaction. When the fuel is butane fuel, the reaction equation of the steam reforming reaction is as follows:

$n\text{-}C_4H_{10} + 8H_2O \Leftrightarrow 4CO_2 + 13H_2$ [Reaction Equation 2]

The steam reforming reaction in the reaction equation 2 is an endothermic reaction and it requires a heat value of about 485.3 KJ/mol in theory.

The heat source unit 20 may be implemented as a heating apparatus generating heat by burning fuel and supplying the generated heat to the reforming reaction unit 10. For example, the heat source unit 20 may include an oxidation catalyst provided in the inside or a flame projector such as a burner. The reaction equation of the combustion reaction of the butane fuel is as follows:

$n\text{-}C_4H_{10} + 6.5O_2 \Leftrightarrow 4CO_2 + 5H_2O$ [Reaction Equation 3]

The combustion reaction in the reaction equation 3 generates a heat value of about 2658.5 KJ/mol in theory.

The CO reducing unit 30 may be implemented as a water gas shift (WGS) reacting unit for transforming or converting carbon monoxide and steam into carbon dioxide and hydrogen gas. In particular, it is preferable that the CO reducing unit 30 has a structure that fluid passing through the inside, such as reformed gas, etc. is moved in a gravity direction, for example, a standing structure that the inner flow passage is connected with the inlet in the upper side and the outlet in the lower side. The reaction equation of the WGS reaction is as follows:

$CO + H_2O \Leftrightarrow CO_2 + H_2$ [Reaction Equation 4]

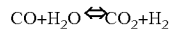

The WGS reaction in the reaction equation 4 generates a heat value of about 41.1 KJ/mol in theory.

Also, the CO reducing unit 30 may include a WGS reacting unit for high temperature with a pyrometer catalyst usable at the temperature of 500° C. or more and a WGS reacting unit for low temperature with a cryometer catalyst usable at the temperature of 200° C. or more, and the WGS reacting unit for high temperature and the WGS reacting unit for low temperature may integrally or independently be disposed.

Also, the CO reducing unit 30 may be disposed to be integrally with the reforming reaction unit 10. In this case, the reforming reaction unit 10 and the WGS reacting unit for high temperature may integrally be disposed, or the reforming reaction unit 10 and the WGS reacting units for high temperature and low temperature may integrally be disposed. When the reforming reaction unit 10 and the WGS reacting unit for high temperature are integrally manufactured, the heat of the heat source unit 20 can efficiently be used, however, when the reforming reaction unit 10 and the WGS reacting units for high temperature and low temperature are integrally manufactured, the length of the reformer becomes longer.

The drain valve 40, which is connected with the outlet in the lower side of the standing structured CO reducing unit 30, is to exhaust liquefied water flowed out from the CO reducing unit 30 to the outside at the time that the operation of the fuel cell stops. The liquefied water that the steam remained in the reforming reaction unit 10 and the CO reducing unit 30 is condensed and flowed out in a gravity direction, does not stay in the standing structured CO reducing unit 30 but passes through it, being exhausted to the outside through the drain valve 40.

Meanwhile, the reformer 100 may further include another CO reducing unit positioned in the rear end of the CO reducing unit 30 and capable of additionally lowering the CO concentration contained in the reformed gas. For example, another CO reducing unit 30 may include a preferential oxidation (PROX) reacting unit. The reaction equation of the PROX reaction is as follows:

$CO + \frac{1}{2}O_2 \Leftrightarrow CO_2$

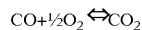

$H_2 + \frac{1}{2}O_2 \Leftrightarrow H_2O$ [Reaction Equation 5]

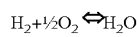

It is preferable that the purging apparatus 200 is implemented as a nitrogen purging apparatus for purging a flow passage by injecting nitrogen into the reforming reaction unit 10 and the CO reducing unit 30 right after the operation of the fuel cell stops. The purging apparatus 200 includes a tube 200 connected with the inlet in which fuel and water are flowed; a first valve 220 for controlling an opening degree of the valve 210, and a second valve for shutting off a flow passage connected with the reformer 100 and the main body 300 of the fuel cell upon performing the purging operation and opening the flow passage upon operating the fuel cell. In particular, upon performing the purging operation, the drain valve 40 may act as a valve for exhausting fluids exhausted from the purging apparatus 200 through the reforming reaction unit 10 and the CO reducing unit 30, such as nitrogen, etc.

Also, although not illustrated in the drawings, the purging apparatus 200 may be constituted to purge the main body 300 of the fuel cell after the operation stops. Specifically, at the time that the operation of the fuel cell stops, the moisture remained in an anode flow field and a cathode flow field of the main body 300 of the fuel cell may wet the metal catalyst of the anode electrode and the cathode electrode, while being condensed due to the drop of the temperature of the main body 300 of the fuel cell, as well as the fuel remained in an anode flow field and a cathode flow field poisons the metal catalyst of the anode electrode and the cathode electrode. Therefore, the fuel cell may be constituted that the main body 300 of the fuel cell is purged by the purging apparatus 200 at the time that the operation of the fuel cell stops.

The main body 300 of the fuel cell, which includes an electrolyte membrane and an unit cell including an anode electrode and a cathode electrode positioned in both sides of the electrolyte membrane, electro-chemically reacts reformed gas supplied to the anode electrode from the reformer 100 with oxidizer supplied to the cathode electrode from the external and generates electric energy. The main body 300 of the fuel cell may be implemented as a polymer electrolyte fuel cell using a polymer membrane requiring humidification, such as Nafion, or a polymer electrolyte fuel cell including an electrolyte membrane in which phosphoric acid not requiring humidification is impregnated.

In particular, the fuel cell easily exhausts moisture which may stay in the reformer at the time that the operation stops so that it prevents the catalyst in the WGS reacting unit from contacting the moisture at the maximum, making it possible to prevent the deterioration of performance of the catalyst, to improve the effect of nitrogen purging operation, which can be performed right after the operation of the fuel cell stops, and further to prevent the deterioration of performance of the catalyst due to the moisture remained in the WGS reacting unit upon re-operating of the fuel cell.

Figure 3:
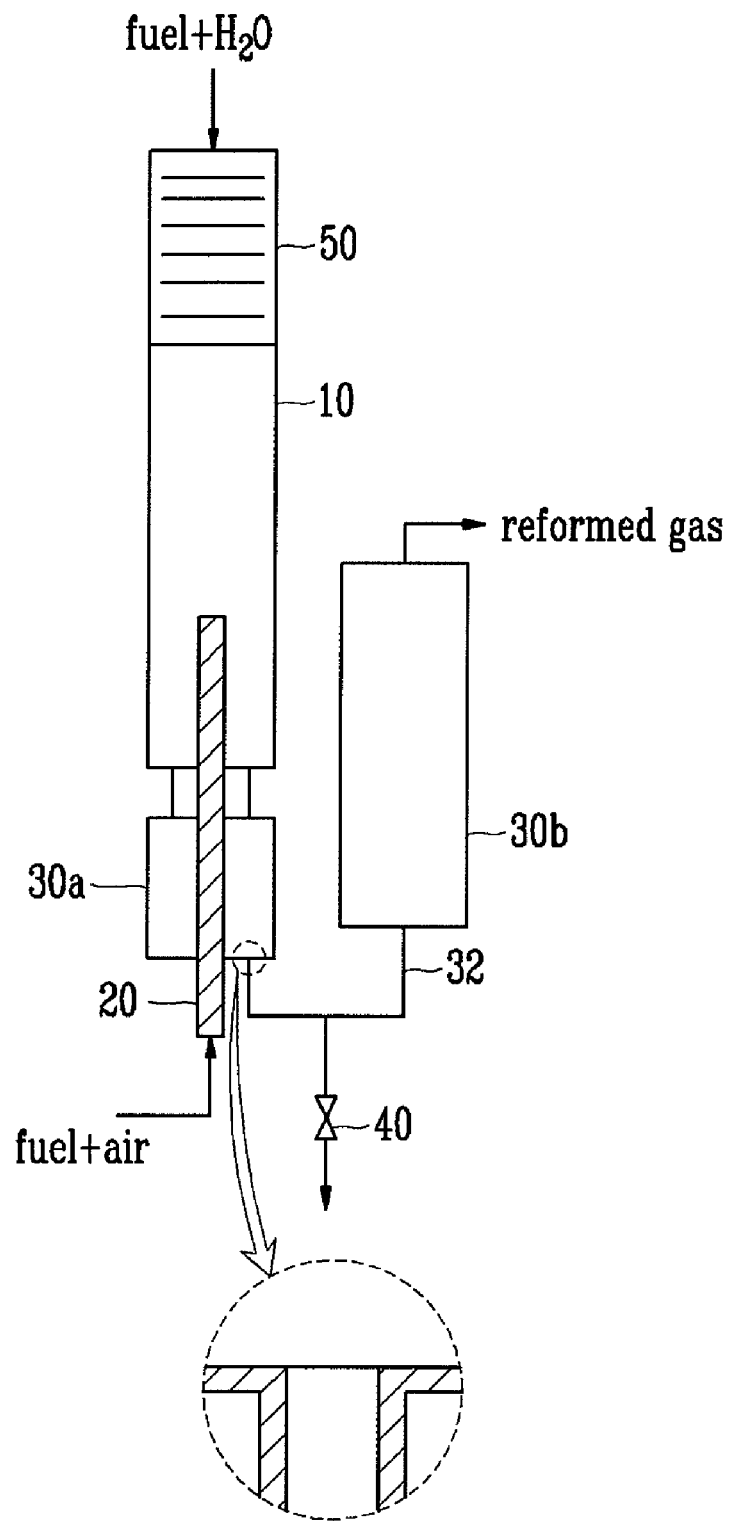
FIG. 3 is a schematic view of a reformer according to an embodiment of the present invention.

FIG. 3 is a schematic view of a reformer according to an embodiment of the present invention. Referring to FIG. 3, a reformer includes a reforming reaction unit 10; a WGS reacting unit for high temperature 30a installed integrally with the reforming reaction unit 10; a WGS reacting unit for low temperature 30b connected with the WGS reacting unit for high temperature 30a and installed to be approximately in parallel in a position adjacent to the WGS reacting unit for high temperature 30a; a heat source unit 20 generating heat by burning fuel and supplying the generated heat to the reforming reaction unit 10; a preheating block 50 mixing and heating fuel and water flowed into the reformer; and a drain valve 40 coupled to the tube 32 connecting the outlet of the WGS reacting unit for high temperature 30a and the inlet of the WGS reacting unit for low temperature 30b.

The reforming reaction unit 10 includes a flow passage disposed in the inside of the main body and allowing fuel and moisture, etc. to be passed through and having a reforming catalyst, and transforms the fuel and the steam into reformed gas having abundant hydrogen gas by means of a catalyst reaction in the atmosphere of about 600° C. or more. As the reforming catalyst, for example, nickel or ruthenium based catalyst may be used. The reforming catalyst may be coated on the flow passage in the reforming reaction unit 10 or be provided on the flow passage in a bead shape. In the case of a bead type catalyst, a reticular formation may be provided in the end part of the flow passage on the side of an outlet in the reforming reaction unit 10, in order to prevent scattering of the catalyst.

The WGS reacting unit for high temperature 30a includes a flow passage allowing reformed gas and steam to be passed through and a pyrometer catalyst usable on the flow passage at the temperature of about 400 to about 500° C., and lowers the concentration of carbon monoxide contained in the reformed gas. As the pyrometer catalyst, for example, $Cr_2O_3/Fe_3O_4$, etc., may be used.

Also, the WGS reacting unit for high temperature 30a includes an inlet in which the reformed gas and the steam generated in the reforming reaction unit 10 are flowed and an outlet transforming carbon monoxide and steam in the reformed gas flowed in into carbon dioxide and hydrogen gas and then exhaust them, wherein in particular, the inlet is positioned in the upper side of the WGS reacting unit for high temperature 30a in a gravity direction, and the outlet is positioned in the lower side of the WGS reacting unit for high temperature 30a in a gravity direction. Such a structure is named as a standing structure in the present specification.

The WGS reacting unit for low temperature 30b includes a flow passage allowing reformed gas to be passed through and a cryometer catalyst usable on the flow passage at the temperature of about 200° C. or more, and additionally lowers the concentration of carbon monoxide in the gas mixture supplied from the WGS reacting unit for high temperature 30a. As the cryometer catalyst, for example, $CuO/ZnO/Al_2O_3$, etc., may be used.

Also, the WGS reacting unit for low temperature 30b includes an inlet in which the reformed gas and the steam risen from the WGS reacting unit for high temperature 30a are flowed and an outlet transforming carbon monoxide and steam in the reformed gas flowed in into carbon dioxide and hydrogen gas and then exhaust them, wherein in particular, the inlet is positioned in the lower side of the WGS reacting unit for low temperature 30b in a gravity direction, and the outlet is positioned in the upper side of the WGS reacting unit for low temperature 30b in a gravity direction. Such a structure is named as a standing structure in the present specification.

The heat source unit 20 is implemented as a burner radiating flame by burning fuel. A nozzle of the burner radiating flame may be installed in the end part of a tube extended from a lower side of the WGS reacting unit for high temperature 30a to the reforming reaction unit 10. Also, the nozzle of the burner may be installed in the inside of the reforming reaction unit 10 through a tube penetrating the inside of the WGS reacting unit for high temperature 30a or adhering to the outside thereof.

The preheating block 50, which is coupled to the front end of the reforming reaction unit 10, mixes and heats fuel and water flowing in a reformer and supplies the heated fuel and steam to the reforming reaction unit 10. The preheating block 50 may be named as an evaporator, and be heated by flame of the heat source unit 20 or the air heated by the flame.

The tube 32 connects the outlet in the lower side of the WGS reacting unit for high temperature 30a with the inlet in the lower side of the WGS reacting unit low temperature 30b so that the reformed gas risen from the WGS reacting unit for high temperature 30a is to be flowed in the WGS reacting unit for low temperature 30b. The drain valve 40, which is for exhausting moisture flowed out from the WGS reacting units for high temperature and low temperature 30a, 30b to the outside, is preferable to be installed in the lowest side of the tube 32 in a gravity direction.

The operation of the reformer is as follows. If fuel and water are injected to the preheating block 50, the fuel and the water is sufficiently evaporated in the preheating block 50 to reach the temperature for a reforming reaction. And, after the fuel and the steam are sufficiently mixed in the preheating block 50, they reach the reforming reaction unit 10. The fuel and the steam reached the reforming reaction unit 10 are transformed into a mixed gas containing abundant hydrogen gas through a steam reforming reaction, that is, reformed gas. The reformed gas partly contains carbon monoxide. The CO concentration of the reformed gas lowers to the extent that the reformed gas is supplied to the main body 300 of the fuel cell, passing through the WGS reacting unit high temperature 30a and the WGS reacting unit low temperature 30b. Such a series of reforming reaction process does not operate by stopping the operation of the fuel cell. The supply of fuel and water to the reformer stops, the operation of the burner heating the preheating block 50 and the reforming reaction unit 10 stops, and a steam of high temperature existing in the inside of the reformer begins to gradually cool and condensed into liquefied water. At this time, the liquefied water remained in the reforming reaction unit 10 and the WGS reacting unit for high temperature 30a and the liquefied water remained in the WGS reacting unit low temperature 30b easily move in a gravity direction. When the drain valve 40 is opened, the moved water is exhausted to the outside. According to an embodiment of the present invention, it is possible to exhaust and remove water which may stay in the reformer after the operation of the fuel cell stops, at a rapid speed.

Figure 4:
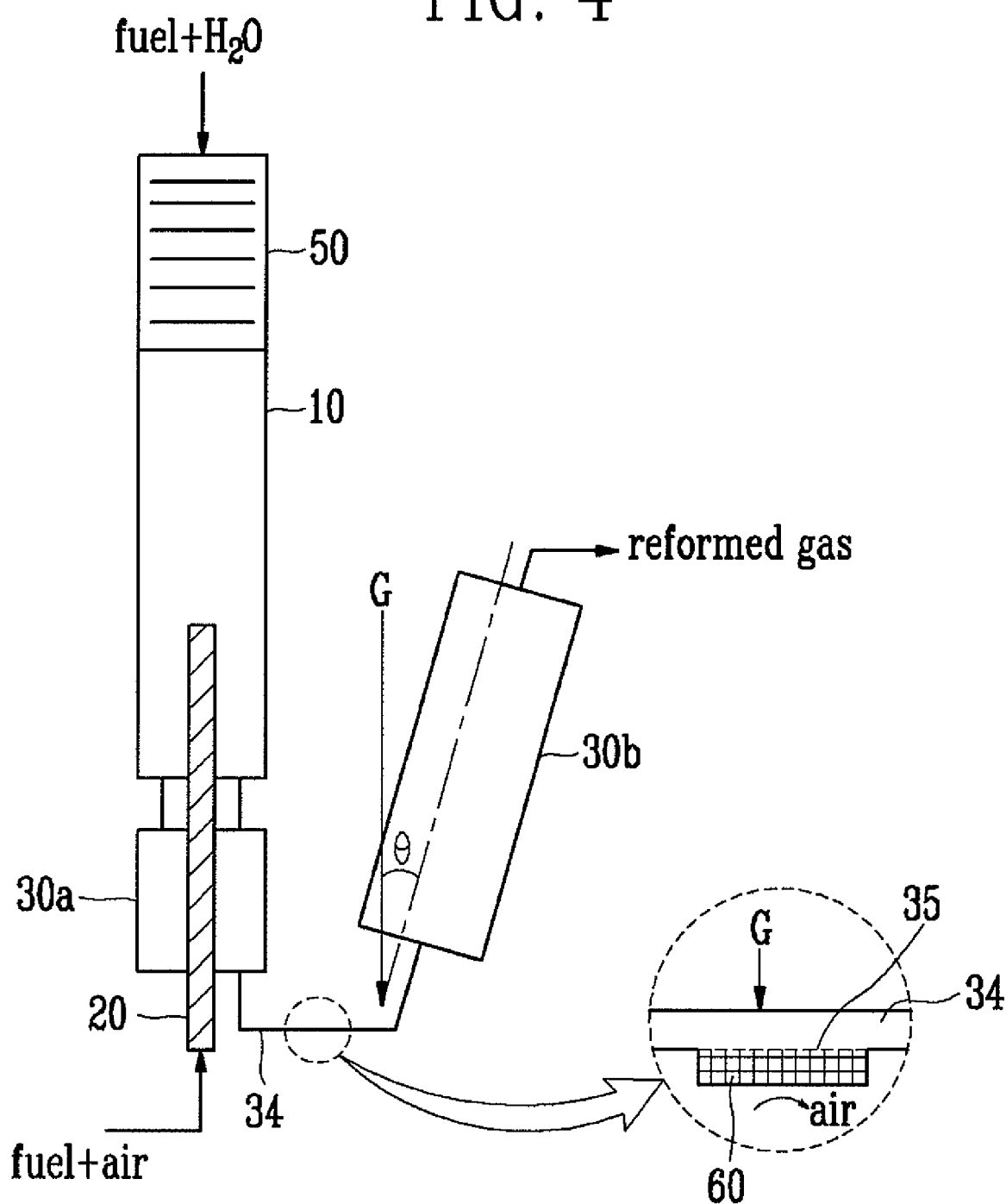
FIG. 4 is a schematic view of a reformer according to an embodiment of the present invention.

FIG. 4 is a schematic view of a reformer according to an embodiment of the present invention. Referring to FIG. 4, a reformer includes: a reforming reaction unit 10 transforming fuel and steam into reformed gas having abundant hydrogen by means of a catalyst reaction; a heat source unit 20 supplying heat to the reforming reaction unit 10 and a preheating block 50; a WGS reacting unit for high temperature 30a having a standing structure, disposed integrally with the reforming reaction unit 10 and lowering the CO concentration contained in the reformed gas; a WGS reacting unit for low temperature 30b having a standing structure and disposed to be inclined in a predetermined angle (θ) to a gravity direction G in a position adjacent to the WGS reacting unit high temperature 30a; a preheating block 50 mixing and heating fuel and water flowing in the reformer; a tube 34 transferring reformed gas risen from the WGS reacting unit for high temperature 30a into the WGS reacting unit for low temperature 30b; a moisture absorbing unit 60 disposed in the lower side of the tube 34 in a gravity direction and absorbing and removing the moisture flowed out from the WGS reacting unit for high temperature 30a and/or the WGS reacting unit for low temperature 30b at the time that the operation of the fuel cell stops.

In the reformer, the WGS reacting unit for low temperature 30b may have a standing structure to be inclined in a predetermined angle to a gravity direction, in addition to a standing structure to be corresponded with a gravity direction. Such a construction may also be applied to the WGS reacting unit for high temperature 30a or the WGS reacting unit for high temperature 30a disposed to be integrally with the reforming reaction unit 10. The predetermined angle includes the range to the extent that the steam is easily flowed out form the reforming reaction unit 10 to the tube 34 through the WGS reacting unit for high temperature 30a by a gravity after the steam which stay in the reforming reaction unit 10 and/or the WGS reacting unit for high temperature 30a is condensed after the operation of the fuel cell stops. The range may arbitrarily be selected depending on the shape or the structure of the reformer, and the shape of the fuel on which the reformer is mounted.

The moisture absorbing unit 60 including an absorbing member capable of absorbing water, is coupled to the lower side of the tube 34 in a gravity direction and remove water flowed out through an aperture 35 of the tube 34 by absorbing water. As the absorbing member, a chemical absorbing member, a physical absorbing member or an absorbing member combining them, etc., may be used. The moisture absorbing unit 60 may be installed to be detachable through an opening portion (not shown) mounted in the tube 34.

As described above, the reactor according to embodiments of the present invention can easily and rapidly exhaust water, which may stay in the WGS reacting unit at the time that the operation of the reformer stops, making it possible to prevent the catalyst provided in the WGS reacting unit from contacting moisture and to minimizing the deterioration of performance of the catalyst due to the water contact in the WGS catalyst. Furthermore, since the deactivation of the WGS catalyst due to water can be prevented, the amount of WGS catalyst used can be reduced to be economical. Furthermore, it is possible to improve the effect of nitrogen purging operation, which may be carried out right after the operation of the fuel cell stops.

Although embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A reformer for a fuel cell, comprising:
   a reforming reactor configured to convert fuel to a reformed gas comprising carbon monoxide;
   a water gas shift reactor comprising an inlet and an outlet, wherein the water gas shift reactor comprises a catalyst, and wherein the water gas shift reactor is configured to receive the reformed gas via the inlet, configured to oxidize at least part of the carbon monoxide contained in the reformed gas, and configured to discharge a resulting gas mixture via the outlet;
   a pipe coupled to the inlet or outlet, wherein the pipe comprises a portion located below the inlet or outlet sufficient to drain liquid water out of the water gas shift reactor to the pipe such that the catalyst is not submerged in liquid water that is to form in the water gas shift reactor when the reformer is not in normal operation and that would otherwise submerge the catalyst; and
   a water reservoir coupled to the pipe,
   wherein the water reservoir is configured to retain liquid water such that more liquid water can be drained from the water gas shift reactor than without the water reservoir, and
   wherein the reservoir comprises a water absorber.

2. The reformer of claim 1, wherein the portion of the pipe generally extends in the direction of gravity.

3. The reformer of claim 1, wherein the portion located below the inlet or outlet is directly attached to, the inlet or outlet without an intervening portion therebetween that extends at about the same level as the inlet or outlet.

4. The reformer of claim 1 further comprising a drain port and a drain valve coupled to the pipe, wherein the drain valve is configured to drain liquid water staying in the pipe via the drain port.

5. A fuel cell, comprising:
   the reformer of claim 1; and
   a fuel cell stack operably connected to the reformer.

6. The fuel cell of claim 5, wherein the portion of the pipe generally extends toward below.

7. The fuel cell of claim 5 further comprising a drain port and a drain valve coupled to the pipe, wherein the drain valve is configured to drain liquid water staying in the pipe via the drain port.

8. The fuel cell of claim 5 further comprising a water reservoir coupled to the pipe, wherein the water reservoir is configured to retain water liquid such that more water liquid can be drained from the water gas shift reactor than without the water reservoir.

9. A reformer for a fuel cell, comprising:
- a reforming reactor configured to convert fuel to a reformed gas comprising carbon monoxide;
- a water gas shift reactor comprising an inlet and an outlet, wherein the water gas shift reactor comprises a catalyst, and wherein the water gas shift reactor is configured to receive the reformed gas via the inlet, configured to oxidize at least part of the carbon monoxide contained in the reformed gas, and configured to discharge a resulting gas mixture via the outlet; and
- a pipe coupled to the inlet or outlet,
- wherein the pipe comprises a portion located below the inlet or outlet sufficient to drain liquid water out of the water gas shift reactor to the pipe such that the catalyst is not submerged in liquid water that is to form in the water gas shift reactor when the reformer is not in normal operation and that would otherwise submerge the catalyst,
- wherein the water gas shift reactor comprises a bottom wall and a side wall extending from the bottom wall,
- wherein the bottom wall and the side wall define a space containing the catalyst,
- wherein the inlet or outlet is formed through the bottom wall,
- wherein the bottom wall is the lowest wall of the water gas shift reactor, and
- wherein the side wall extends in a direction inclined at an angle with respect to the direction of gravity.

10. A reformer for a fuel cell, comprising
- a reforming reactor configured to convert fuel to a reformed gas comprising carbon monoxide;
- a water gas shift reactor comprising an inlet and an outlet, wherein the water gas shift reactor comprises a catalyst, and wherein the water gas shift reactor is configured to receive the reformed gas via the inlet, configured to oxidize at least part of the carbon monoxide contained in the reformed gas, and configured to discharge a resulting gas mixture via the outlet;
- a pipe coupled to the inlet or outlet, wherein the pipe comprises a portion located below the inlet or outlet sufficient to drain liquid water out of the water gas shift reactor to the pipe such that the catalyst is not submerged in liquid water that is to form in the water gas shift reactor when the reformer is not in normal operation and that would otherwise submerge the catalyst; and
- a secondary water gas shift reactor which comprises an inlet and an outlet, wherein the secondary water gas shift reactor comprises a catalyst,
- wherein the secondary water gas shift reactor is configured to receive the resulting gas mixture via the inlet, configured to oxidize at least part of carbon monoxide contained in the resulting gas mixture, and configured to discharge a second resulting gas mixture via the outlet,
- wherein the pipe is coupled to the outlet of the water gas shift reactor and the inlet of the secondary water gas shift reactor, and
- wherein the pipe comprises a secondary portion located below the inlet of the secondary water gas shift reactor sufficient to drain liquid water out of the secondary water gas shift reactor to the pipe such that the catalyst of the secondary water gas shift reactor is not submerged in liquid water that is to form in the secondary water gas shift reactor when the reformer is not in normal operation and that would otherwise submerge the catalyst of the second water gas shift reactor.

11. The reformer of claim 10, wherein during the normal operation of the reactors the resulting gas mixture is hotter than the second resulting gas mixture.

* * * * *